United States Patent Office 2,780,652
Patented Feb. 5, 1957

2,780,652

PREPARATION OF HIGH PURITY FORMALDEHYDE

Frederick William Gander, Williamsville, N. Y., assignor to E. I. du Pont de Nemours and Company, Wilmington, Del., a corporation of Delaware No Drawing. Application May 13, 1954, Serial No. 429,681

6 Claims. (Cl. 260—606)

This invention relates to a process for purifying formaldehyde, and more specifically, it relates to a process for the removal of water and formic acid from formaldehyde.

Because of the high reactivity of formaldehyde it has been difficult to prepare formaldehyde of high purity. Normally, the purification and dehydration of formaldehyde is ended by the formation of solid paraformaldehyde which may contain 1% to 5% water and other impurities such as formic acid, methanol, methylal, and methyl formate. Attempts to treat paraformaldehyde with desiccants, adsorbents, etc. have so far been unsuccessful in further purifying the formaldehyde to any great extent.

A novel process has now been found which can produce highly purified formaldehyde. This process is particularly desirable for treating and further purifying the formaldehyde produced by the pyrolysis of paraformaldehyde, or formaldehyde from any other source which inherently contains more than about 1% water and other impurities. Because distillation techniques can economically concentrate formaldehyde solutions to about 5%–10% water, it is preferred to utilize in this process a starting material containing at least about 90%–95% formaldehyde.

It is an object of this invention to provide formaldehyde of high purity. It is another object to prepare vaporous formaldehyde of at least 99.9% purity. It is a further object of this invention to provide a process for preparing formaldehyde with less than about 0.02% of water content. Another object of this invention is to prepare formaldehyde with less than about 0.03% of formic acid content. Other objects will appear in the more detailed description presented hereinbelow.

The above objects are accomplished by subjecting formaldehyde to the action of a polyethylene glycol dialkyl ether under conditions which will produce formaldehyde containing as impurities, less than about 200 p. p. m. water and less than 300 p. p. m. formic acid. In the preferred embodiment of this invention the formaldehyde is contacted with tetraethylene glycol dimethyl ether or diethylene glycol diethyl ether in a scrubbing operation in which the glycol ether is the scrubbing liquid. The glycol ether, at about 100° C. to about 140° C., preferably flows in a countercurrent fashion to an unpurified formaldehyde stream containing 95–99% formaldehyde and 1–5% of a combination of water, formic acid, and other normal impurities such as those mentioned above. The glycol ether and the formaldehyde are intimately contacted with each other in any desirable apparatus such as a sieve plate column or a packed column, the glycol ether being introduced at the top of the column and flowing downwardly as a liquid while the formaldehyde is introduced in the lower part of the column and flows upwardly as a vapor.

The results obtained by the present process are surprising in that prior art literature references indicate that atmospheric pressure distillation of water-formaldehyde solutions should produce about the same concentration of water in the vapor phase as in the liquid phase. It has now been discovered that by incorporating a scrubbing liquid, such as a polyethylene glycol dialkyl ether, into the system, a separation can be effected in which the formaldehyde appears in the vapor phase and the water, along with the scrubbing compound, in the liquid phase. It is also surprising that, by the process of this invention, water and other impurities can be removed from formaldehyde by maintaining the temperature of the scrubbing liquid at a high level. This result is surprising in that it would be expected that the capacity of the scrubbing liquid for absorbing impurities such as water become less and less as the temperature increased. In the preferred operation using the glycol ethers described in this invention it has been found advantageous to operate at temperatures above 100° C., at which temperatures it might be expected that water would vaporize so readily that the scrubbing liquid would not efficiently remove water from the formaldehyde vapor. Since it is well known that at low temperatures the water-formaldehyde composition will polymerize to form paraformaldehyde, or other similar low polymers of formaldehyde, it is not feasible to employ the present process at low temperatures in the hope of increasing the efficiency of the scrubbing operation.

The following examples will serve to illustrate the details of this invention, although it is not intended that the examples will limit this invention in any way.

*Examples 1 and 2.*—A scrubbing column was prepared from glass tubing 65 mm. in diameter and 6' long which was packed with 5/16" stainless steel packing. Impure formaldehyde was introduced at the bottom of the column as a vapor and tetraethylene glycol dimethyl ether was introduced at the top of the column as a liquid. These two components flowed countercurrently within the scrubbing column, a purified formaldehyde vapor being removed from the top of the column as a product and the dimethyl ether scrubbing liquid being removed from the bottom contaminated with the impurities extracted from the formaldehyde vapor. The results shown in Table I were obtained by operation of the described process over a period of about 3 to 5 hours. The inlet formaldehyde was produced by pyrolyzing a slurry of paraformaldehyde in liquid dioctyl phthalate.

*Examples 3 and 4.*—In these examples the process was operated as described in Examples 1 and 2 and analyses were made of the formic acid content of the formaldehyde entering and leaving the scrubbing column. The results are shown in Table I indicating that in Example 3 the formic acid content was reduced 86.4% and in Example 4 the formic acid content was reduced 82.2%.

Table I

| Example | Weight Percent Water Inlet Glycol Ether | Weight Percent Water Inlet Formaldehyde | Weight Percent Water Exit Formaldehyde | Weight Percent HCOOH Inlet Formaldehyde | Weight Percent HCOOH Exit Formaldehyde | Temperature of Glycol Ether in Scrubbing Column, 0° C. | Scrubbing Column Flow Rate (L/G) lbs. Inlet Glycol Ether/lbs. Inlet Formaldehyde |
|---|---|---|---|---|---|---|---|
| 1 | 0.002 | 0.94 | 0.0179 | | | 105 | 8.1 |
| 2 | 0.002 | 0.87 | 0.019 | | | 105 | 11.7 |
| 3 | | | | 0.19 | 0.026 | 105 | 4.5 |
| 4 | | | | 0.14 | 0.025 | 90 | 15.8 |

The process of this invention is particularly well suited to receive in a continuous fashion formaldehyde-water compositions containing up to about 5% by weight of water and to discharge a purified formaldehyde containing less than about .02% by weight of water. One or more distillation-type columns may be utilized in which the scrubbing liquid is introduced near the top of the column and the impure formaldehyde is introduced near the bottom of the column. The column may be a packed column or a plate column or any other known type of distillation apparatus in which the scrubbing liquid flows countercurrently and in intimate contact with the formaldehyde. The temperature and pressure conditions in the column are maintained at such a level that the scrubbing compound remains as a liquid, and unexpectedly, the water is held by the scrubbing liquid while the formaldehyde is freed as a vapor. In such a system purified formaldehyde vapors may be removed from the top of the scrubbing column and may be condensed or otherwise processed for later use elsewhere. The scrubbing liquid containing the water, formic acid, and other impurities from the formaldehyde stream is removed from the bottom of the column and may then be purified by known methods and recycled to the top of the scrubbing column.

A convenient method of regenerating and purifying the glycol ethers employed in this invention is to conduct the glycol ether leaving the scrubbing column to another location at which the glycol ether is allowed to stand for a short time during which any excess formaldehyde may form a solid polymer which can then be removed by filtration. This polymer may be recycled and pyrolyzed, followed by incorporating the pyrolysis vapors into the impure formaldehyde which is fed into the scrubbing column. The glycol ether, after removal of formaldehyde polymer by filtration, may still contain a small amount of absorbed formaldehyde which may be removed in a stripping column maintained at about 300-400 mm. Hg absolute pressure and about 105° C., formaldehyde vapors being removed from the top of the stripping column and a liquid glycol ether free of formaldehyde being removed from the bottom of the column. This glycol ether is then fed into a second stripping column maintained at about 60-70 mm. Hg absolute pressure and about 190° C., in which a water-rich vapor is removed overhead and a purified glycol ether is removed from the bottom of the column. Such a stripping column is capable of producing glycol ether containing about 0.002% or less water. The purified glycol ether used in the process of this invention preferably will contain not more than about 0.002% water and not more than about 0.06% formaldehyde. Such purified glycol ether may then be fed into the top of the scrubbing column which produces the purified formaldehyde of this invention.

The scrubbing liquids which may be utilized in this invention are the polyethylene glycol dialkyl ethers of the general formula:

$$R_1(OCH_2CH_2)_nOR_2$$

wherein $R_1$ and $R_2$ are alkyl groups and $n$ is any integer from 1 to about 6. The preferred compounds include those in which $R_1$ and $R_2$ are methyl or ethyl groups and $n$ is from 2 to 4. Particularly suitable compounds are tetraethylene glycol dimethyl ether, and diethylene glycol diethyl ether. These glycol ethers are particularly desirable because they do not react with formaldehyde, in contradistinction to glycols which do react with formaldehyde, they are extremely stable through repeated exposures to high temperatures, and they are highly miscible with water as well as easily separated from water.

The formaldehyde solutions which may be purified by the process of this invention may be derived from any of several sources well known to those skilled in the art. This process could be used, for example, with a 37% solution which is commercially available or a 60% solution, which is easily prepared by concentration of weaker solutions, to produce the purified formaldehyde described herein, although it would be very uneconomical because of the large quantity of scrubbing liquid necessary to produce correspondingly small quantities of purified formaldehyde. It is much easier to utilize known distillation, condensation, drying, or other methods to produce a composition containing at least about 95% formaldehyde, which may then be treated by the process of this invention to produce a highly purified formaldehyde containing not more than about 0.1% of impurities.

There are at least two sources of 95-99% formaldehyde which are solid polymers of formaldehyde, the polymer containing about 95% formaldehyde being known as paraformaldehyde, and the polymer containing about 99% formaldehyde being known as alpha-polyoxymethylene. Processes for preparing these two solid polymers are well known in the art, typical preparations being described in Walker's Monograph on "Formaldehyde," published by Reinhold Publishing Corp. (1944). These solid polymers may be pyrolyzed to produce monomeric vapors containing essentially the same concentration of formaldehyde as was present in the polymer. It may be convenient to use such solid polymers, in certain embodiments of this invention, as the impure formaldehyde which is treated by the scrubbing procedure described herein to produce a highly purified formaldehyde.

The amount of scrubbing liquid is conveniently correlated with the amount of formaldehyde which is to be scrubbed. By utilizing a ratio of the weight of scrubbing liquid (L) to the weight of impure formaldehyde (G), which ratio is commonly termed L/G, limits may be set in defining the preferred embodiments of this invention, that is, when the formaldehyde starting material is about 95% or more pure. At high values of L/G the solubility of formaldehyde in the glycol ether scrubbing liquid becomes excessive and therefore requires considerable recirculation of recovered formaldehyde. The lower limit of the L/G ratio is determined by the ability of the glycol ether to remove impurities from the formaldehyde stream. The preferred value for the L/G ratio is from 5, a value of about 12 being the high limit mentioned above and a value of 1 or 2 being the lower limit mentioned above.

The temperature of the scrubbing process of this invention is limited by the fact that at low temperatures, below about 90° C., polymerization occurs in the scrubbing column and thus effectively stops any further purification and at high temperatures, above about 150° C., the glycol ether loses its ability to remove water and other impurities from the formaldehyde stream. The preferred limits for the temperature at which this process is operated are therefore from about 100° C. to about 140° C., although the upper limit may vary with different glycol ethers.

This process is particularly applicable as a continuous system for removing water, formic acid, methanol, and other impurities from a formaldehyde stream by scrubbing with a polyethylene glycol dialkyl ether followed by purification of the glycol ether to remove absorbed formaldehyde and the impurities picked up by the glycol ether, and thereafter returning the formaldehyde and glycol ether in a recycle operation to the original scrubbing column. In this manner, a maximum saving of formaldehyde is effected, and the scrubbing liquid is regenerated for use over and over again.

I claim:

1. A process for preparing highly concentrated formaldehyde which comprises intimately contacting a composition containing at least 95% formaldehyde, the remaining components comprising at least one from the group consisting of water, formic acid, methanol, methyl formate, and methylal, with a polyethylene glycol dialkyl ether and recovering a fluid composition containing at least 99.9% by weight of formaldehyde and not more than 0.1% water.

2. The process of claim 1 in which the polyethylene glycol dialkyl ether is tetraethylene glycol dimethyl ether.

3. The process of claim 1 in which the polyethylene glycol dialkyl ether is diethylene glycol diethyl ether.

4. A continuous process for preparing highly concentrated formaldehyde which comprises a scrubbing step in which a liquid stream of a polyethylene glycol dialkyl ether maintained at a temperature of 100°–140° C. is intimately contacted with a countercurrently flowing vapor stream of impure formaldehyde containing at least 95% by weight of formaldehyde and the remainder comprising water and formic acid as impurities, recovering a fluid composition comprising at least 99.9% by weight of formaldehyde, not more than 0.02% by weight of water and not more than 0.03% by weight of formic acid, recovering the polyethylene glycol dialkyl ether contaminated with impurities removed from the formaldehyde stream, subjecting the contaminated glycol ether to purification steps to produce a purified glycol ether containing not more than 0.002% by weight of water, said purification steps including the removal of any solid formaldehyde polymer from the contaminated glycol ether followed by a distillation of the glycol ether to remove formaldehyde and water, and thereafter recirculating said purified glycol ether to said scrubbing step.

5. The process of claim 4 in which the polyethylene glycol dialkyl ether is tetraethylene glycol dimethyl ether.

6. The process of claim 4 in which the polyethylene glycol dialkyl ether is diethylene glycol diethyl ether.

References Cited in the file of this patent

UNITED STATES PATENTS 2,678,905  Dice ................... May 18, 1954